United States Patent Office 3,279,988
Patented Oct. 18, 1966

3,279,988
PROCESS OF TREATING HELMINTHIASIS WITH OXADIAZOLE DERIVATIVES
Walter E. Buting and Cameron Ainsworth, Indianapolis, Ind., assignors to Eli Lilly and Company, Indianapolis, Ind., a corporation of Indiana
No Drawing. Filed Mar. 17, 1965, Ser. No. 440,627
5 Claims. (Cl. 167—53)

The present application is a continuation-in-part of our copending application Serial No. 176,773, filed March 1, 1962, and now abandoned.

This invention relates to a novel process for the treatment of helminthiasis and to certain novel compositions suitable therefor. More particularly this invention relates to the treatment of helminthiasis with compositions comprising 3-substituted-oxadiazole derivatives.

Helminthiasis is recognized as one of the world's major medical and veterinary problems. The serious consequences of helminth infections are not limited to the situations in which the parasitic infection is so severe that death results. The sequelae of nonfatal infections, though perhaps less dramatic, are nevertheless serious and of great economic importance. In human beings, these are reflected in a greatly decreased initiative and ability to do productive work and in a general impairment of health. In animals, the economic losses brought about by parasitic infections of species grown commercially are staggering. The debilitating effects which can be the result of insidious infections result in a decreased feed efficiency and carcass quality and increase the susceptibility of the animals to other disease conditions. Compositions which would control helminthiasis would constitute a valuable contribution to the art.

It is an object of this invention to provide compositions effective in treating helminthiasis. It is a further object of the invention to provide a method for the treatment of helminth infections.

In accordance with the invention, helminthiasis is effectively treated by administering an effective dose of a compound represented by the following structural formula:

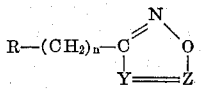

wherein
$n$ is a whole number from 0 to 3;
R represents $C_1$–$C_8$ alkyl or a substituted or unsubstituted aryl or heterocyclic group, having when substituted, one or more substituents such as $C_1$–$C_4$ alkyl, $C_1$–$C_4$ alkoxy, amino, lower alkylamino or dialkylamino having up to six carbons, hydroxy, halo, nitro, cyano, trifluoromethyl, and the like; and
Y and Z are selected from the group consisting of H—C and N, Y being H—C when Z is N, and Y being N when Z is H—C.

It is thus seen that the invention encompasses the use of 3-substitued-1,2,4-oxadiazoles and 3-substituted-1,2,5-oxadiazoles, also known as furazans, for the treatment of helminthiasis.

When R is alkyl, it can be either straight or branched chain and can include groups such as methyl, ethyl, propyl, isopropyl, butyl, isobutyl, t-butyl, hexyl, octyl, and the like.

Illustrative of the aryl groups which can be employed are phenyl, chlorophenyl, bromophenyl, fluorophenyl, nitrophenyl, tolyl, xylyl, ethylphenyl, butylphenyl, methoxyphenyl, hydroxyphenyl, aminophenyl, methylaminophenyl, ethylaminophenyl, dimethylaminophenyl, diethylaminophenyl, dipropylaminophenyl, dichlorophenyl, methylchlorophenyl, cyanophenyl, trifluoromethylphenyl, naphthyl, fluorenyl, and the like.

Among the heterocyclic groups that can be employed are furyl, pyridyl, picolyl, thienyl, thiazolyl, oxazolyl, pyrazolyl, nitropyridyl, halopyridyl, and the like. In general, it may be said that R can be any group which is available via the nitrile employed as one of the starting materials in the synthesis.

The following list illustrates the wide variety of compounds which can be employed in the practice of the invention. It is to be understood, however, that the list is illustrative, rather than exclusive, and that many compounds represented by the general formula, although not named herein, are nevertheless useful in carrying out the process of the invention and are to be considered to be within the scope thereof. Among the compounds useful in the treatment of helminthiasis as described herein are 3-methyl-1,2,4-oxadiazole
3-ethyl-1,2,4-oxadiazole
3-propyl-1,2,4-oxadiazole
3-isopropyl-1,2,4-oxadiazole
3-butyl-1,2,4-oxadiazole
3-isobutyl-1,2,4-oxadiazole
3-pentyl-1,2,4-oxadiazole
3-hexyl-1,2,4-oxadiazole
3-heptyl-1,2,4-oxadiazole
3-octyl-1,2,4-oxadiazole
3-phenyl-1,2,4-oxadiazole
3-(o-chlorophenyl)-1,2,4-oxadiazole
3-(m-chlorophenyl)-1,2,4-oxadiazole
3-(p-chlorophenyl)-1,2,4-oxadiazole
3-(o-bromophenyl)-1,2,4-oxadiazole
3-(m-bromophenyl)-1,2,4-oxadiazole
3-(p-bromophenyl)-1,2,4-oxadiazole
3-(o-fluorophenyl)-1,2,4-oxadiazole
3-(m-fluorophenyl)-1,2,4-oxadiazole
3-(p-fluorophenyl)-1,2,4-oxadiazole
3-(o-iodophenyl)-1,2,4-oxadiazole
3-(o-trifluoromethylphenyl)-1,2,4-oxadiazole
3-(m-trifluoromethylphenyl)-1,2,4-oxadiazole
3-(p-trifluoromethylphenyl)-1,2,4-oxadiazole
3-(2,3-dichlorophenyl)-1,2,4-oxadiazole
3-(2,4-dichlorophenyl)-1,2,4-oxadiazole
3-(2,5-dichlorophenyl)-1,2,4-oxadiazole
3-(3,4-dichlorophenyl)-1,2,4-oxadiazole
3-(o-nitrophenyl)-1,2,4-oxadiazole
3-(m-nitrophenyl)-1,2,4-oxadiazole
3-(p-nitrophenyl)-1,2,4-oxadiazole
3-(o-tolyl)-1,2,4-oxadiazole
3-(m-tolyl)-1,2,4-oxadiazole
3-(p-tolyl)-1,2,4-oxadiazole
3-(2,3-dimethylphenyl)-1,2,4-oxadiazole
3-(2,4-dimethylphenyl)-1,2,4-oxadiazole
3-(2,5-dimethylphenyl)-1,2,4-oxadiazole
3-(2,6-dimethylphenyl)-1,2,4-oxadiazole
3-(3,4-dimethylphenyl)-1,2,4-oxadiazole
3-(3,5-dimethylphenyl)-1,2,4-oxadiazole
3-(p-ethylphenyl)-1,2,4-oxadiazole
3-(p-t-butylphenyl)-1,2,4-oxadiazole
3-(p-hydroxyphenyl)-1,2,4-oxadiazole
3-(p-aminophenyl)-1,2,4-oxadiazole
3-(o-methoxyphenyl)-1,2,4-oxadiazole
3-(m-methoxyphenyl)-1,2,4-oxadiazole
3-(p-methoxyphenyl)-1,2,4-oxadiazole
3-(3,4-dimethoxyphenyl)-1,2,4-oxadiazole
3-(p-methylaminophenyl)-1,2,4-oxadiazole
3-(p-ethylaminophenyl)-1,2,4-oxadiazole
3-(p-dimethylaminophenyl)-1,2,4-oxadiazole
3-(p-diethylaminophenyl)-1,2,4-oxadiazole
3-(p-dipropylaminophenyl)-1,2,4-oxadiazole
3-(2-methyl-4-chlorophenyl)-1,2,4-oxadiazole 3-(2-chloro-4-methylphenyl)-1,2,4-oxadiazole
3-(3-chloro-4-methylphenyl)-1,2,4-oxadiazole
3-(3-methyl-4-chlorophenyl)-1,2,4-oxadiazole
3-(o-cyanophenyl)-1,2,4-oxadiazole
3-benzyl-1,2,4-oxadiazole
3-(o-chlorobenzyl)-1,2,4-oxadiazole
3-(o-bromobenzyl)-1,2,4-oxadiazole
3-(p-fluorobenzyl)-1,2,4-oxadiazole
3-(p-iodobenzyl)-1,2,4-oxadiazole
3-(m-trifluoromethylbenzyl)-1,2,4-oxadiazole
3-(2,4-dichlorobenzyl-1,2,4-oxadiazole
3-(p-nitrobenzyl)-1,2,4-oxadiazole
3-(p-methylbenzyl)-1,2,4-oxadiazole
3-(p-ethylbenzyl)-1,2,4-oxadiazole
3-(o-methoxybenzyl)-1,2,4-oxadiazole
3-(3,4-dimethoxybenzyl)-1,2,4-oxadiazole
3-(p-methylaminobenzyl)-1,2,4-oxadiazole
3-(p-ethylaminobenzyl)-1,2,4-oxadiazole
3-(p-dimethylaminobenzyl)-1,2,4-oxadiazole
3-phenethyl-1,2,4-oxadiazole
3-(γ-phenylpropyl)-1,2,4-oxadiazole
3-(2-furyl)-1,2,4-oxadiazole
3-(2-pyridyl)-1,2,4-oxadiazole
3-(3-pyridyl)-1,2,4-oxadiazole
3-(2-thienyl)-1,2,4-oxadiazole
3-[2-(6-nitropyridyl)]-1,2,4-oxadiazole
3-[2-(6-chloropyridyl)]-1,2,4-oxadiazole
3-methyl-1,2,5-oxadiazole
3-ethyl-1,2,5-oxadiazole
3-propyl-1,2,5-oxadiazole
3-isopropyl-1,2,5-oxadiazole
3-butyl-1,2,5-oxadiazole
3-isobutyl-1,2,5-oxadiazole
3-pentyl-1,2,5-oxadiazole
3-hexyl-1,2,5-oxadiazole
3-heptyl-1,2,5-oxadiazole
3-octyl-1,2,5-oxadiazole
3-phenyl-1,2,5-oxadiazole
3-(o-chlorophenyl)-1,2,5-oxadiazole
3-(m-bromophenyl)-1,2,5-oxadiazole
3-(p-fluorophenyl)-1,2,5-oxadiazole
3-(o-iodophenyl)-1,2,5-oxadiazole
3-(m-trifluoromethylphenyl)-1,2,5-oxadiazole
3-(2,4-dichlorophenyl)-1,2,5-oxadiazole
3-(p-nitrophenyl)-1,2,5-oxadiazole
3-(o-tolyl)-1,2,5-oxadiazole
3-(2,4-dimethylphenyl)-1,2,5-oxadiazole
3-(p-ethylphenyl)-1,2,5-oxadiazole
3-(p-t-butylphenyl)-1,2,5-oxadiazole
3-(p-methoxyphenyl)-1,2,5-oxadiazole
3-(3,4-dimethoxyphenyl)-1,2,5-oxadiazole
3-(p-dimethylaminophenyl)-1,2,5-oxadiazole
3-benzyl-1,2,5-oxadiazole
3-(o-chlorobenzyl)-1,2,5-oxadiazole
3-(o-bromobenzyl)-1,2,5-oxadiazole
3-(p-fluorobenzyl)-1,2,5-oxadiazole
3-(p-iodobenzyl)-1,2,5-oxadiazole
3-(m-trifluoromethylbenzyl)-1,2,5-oxadiazole
3-(2,4-dichlorobenzyl)-1,2,5-oxadiazole
3-(p-nitrobenzyl)-1,2,5-oxadiazole
3-(p-methylbenzyl)-1,2,5-oxadiazole
3-(p-ethylbenzyl)-1,2,5-oxadiazole
3-(o-methoxybenzyl)-1,2,5-oxadiazole
3-(3,4-dimethoxybenzyl)-1,2,5-oxadiazole
3-(p-methylaminobenzyl)-1,2,5-oxadiazole
3-(p-ethylaminobenzyl)-1,2,5-oxadiazole
3-(p-dimethylaminobenzyl)-1,2,5-oxadiazole
3-(2-furyl)-1,2,5-oxadiazole
3-(2-pyridyl)-1,2,5-oxadiazole
3-(3-pyridyl)-1,2,5-oxadiazole
3-(2-thienyl)-1,2,5-oxadiazole
3-(2-naphthyl)-1,2,5-oxadiazole
3-(9-fluorenyl)-1,2,5-oxadiazole According to a preferred embodiment of the invention, the 3-substituted-1,2,4-oxadiazoles are employed for treating helminth infections. These compounds can be prepared by the reaction of an appropriately substituted amidoxime of the formula

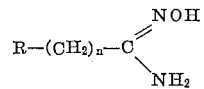

wherein R and $n$ have the above-assigned meanings, with an excess of ethyl orthoformate, also known as triethyl orthoformate, preferably at the reflux temperature of the mixture. The required amidoximes can be prepared by methods known in the art, for example, by the reaction of the appropriate nitrile, hydroxylamine hydrochloride, and sodium or potassium carbonate in aqueous ethanol. The reaction of the amidoxime with ethyl orthoformate will take place over a considerable temperature range, and temperatures above the reflux temperature can be employed by heating the reactants in a pressure vessel. The optimum reaction time, of course, will vary to some extent according to the nature of the reactants and the temperature at which the reaction is carried out. As a rule when the reaction is carried out at temperatures higher than the reflux temperature, a shorter reaction time can be employed. In general, reaction times of from about two to about twenty-four hours at temperatures from about 75° C. to about 250° C. can be employed, preferably about two to five hours at reflux temperature. Prolonged heating beyond the time necessary to complete the reaction is undesirable since the desired 3-substituted-1,2-4-oxadiazoles tend to undergo decomposition upon extended heating.

In an alternative method for the preparation of the 3-substituted-1,2,4-oxadiazoles, the appropriately substituted amidoxime is heated with formic acid to produce the desired compound. In still another method, the amidoxime is heated, generally at the reflux temperature of the mixture, with the mixed anhydride derived from acetic anhydride and formic acid. Just as in the method employing ethyl orthoformate, the reaction time and the temperature at which the reaction is conducted are interdependent and a wide range of conditions can be employed. Generally, reaction times of one to five hours at reflux temperature are satisfactory.

The 3-substituted -1,2,4-oxadiazoles can be recovered directly from the reaction mixtures by employing distillation or recrystallization techniques. It is especially important to avoid prolonged exposure to basic conditions by working up the reaction mixtures inasmuch as the compounds are more or less unstable in the presence of base and decompose to give, among other decomposition products, the nitriles from which the starting amidoximes were derived.

The 3-substituted-1,2,5-oxadiazoles are prepared by ring closure of the appropriate glyoximes. This is accomplished conveniently by heating the glyoxime with succinic anhydride. Generally, at temperatures between about 100° C. and about 200° C., a spontaneous reaction takes place and external cooling is usually necessary to control the reaction. Other methods of ring closure can also be employed, as for example, heating the glyoxime under reflux with an aqueous solution of a base such as sodium hydroxide, ammonium hydroxide, and the like.

The preparation of the compounds employed in the invention is illustrated by the following preparative examples which are typical of the methods used to obtain the desired compounds.

PREPARATION OF 3-p-CHLOROPHENYL-
1,2,4-OXADIAZOLE

*Method A.*—A solution of 17 g. of p-chlorobenzamidoxime (M.P. 130° C.) in 100 ml. of ethyl orthoformate is heated under reflux for four hours. The reaction mixture is distilled under vacuum and the 3-p-chlorophenyl-1,2,4-oxadiazole, boiling at about 140° C. at about 10 mm. mercury pressure, is collected. The product crystallizes in the condenser and melts at about 100–103° C. *Analysis.*—Calc.: C, 53.20; H, 2.79; N, 15.51. Found: C, 53.32; H. 3.04; N, 15.21.

*Method B.*—A mixture of 10 g. p-chlorobenzamidoxime and 25 ml. of formic acid is heated under reflux for one hour. The reaction mixture is cooled and diluted with water and the solid which is precipitated is collected by filtration. Recrystallization from ethanol affords 3-p-chlorophenyl-1,2,4-oxadiazole melting at about 100° C.

*Method C.*—A mixture of 20 ml. of acetic anhydride and 8.5 ml. of formic acid is heated for two hours to produce the mixed anhydride. To this are added 5 g. of p-clorobenzamidoxime and the resulting mixture is heated under reflux for one hour. The 3-p-chlorophenyl-1,2,4-oxadiazole is isolated by the procedure of Method A and melts at about 100–103° C.

PREPARATION OF 3-PHENYL-1,2,5-OXADIAZOLE

A mixture of 16.4 g. of phenylgloxime and 10 g. of sucminic anhydride is stirred mechanically while being heated by means of a Bunsen burner. As the internal temperature reaches about 130° C., a spontaneous exothermic reaction takes place and the temperature raises rapidly. The temperature is maintained in the range of about 120–190° C. for about 10 minutes by cooling or heating as required. The reaction mixture is cooled, diluted with water, and made basic by the addition of sodium carbonate. The mixture is extratced with ether and the ether extracts are dried over anhydrous magnesium sulfate. After filtration to remove the drying agent, and evaporation of the solvent, the residue is distilled at reduced pressure to give 3-phenyl-1,2,5-oxadiazole boiling at about 110° C. at about 10 mm. mercury pressure. *Analysis.*—Calc.: C, 65.75; H, 4.14. Found: C, 65.76; H, 4.56.

The nitrogen atoms of the oxadiazole nucleus are not sufficiently basic to permit salt formation with acids. However, the substituent in the 3-position can carry basic groups capable of forming salts, and the use of such salts in within the scope of this invention. These salts are prepared by the coinventional methods known in the art. Typical acid addition salts are the hydrochlorides, hydrobromides, hydroiodides, sulfates, phosphates, acetates, citrates, oxalates, maleates, malates, succinates, tartrates, tosylates, embonates, and the like.

The process of the present invention is an effective treatment of helminthiasis. Of particular interest is the activity of the compositions employed against the trichostrongyles *Nematospiroides dubius* in mice and *Nippostrongylus muris* in rats in single oral doses as low as 50 mg./kg. of host body weight. In addition, the compounds are effective against hookworm and other trichostrongylid infections. At somewhat higher doses, both species of mouse pinworms, *Syphacia obvelata* and *Aspiculuris tetraptera* are controlled.

For treatment of helminthiasis, the compounds can be given in doses of from about 50 to about 1000 mg./kg. of host body weight, the lower doses, of course, being less completely effective. A preferred does for most purposes is about 200 mg./kg. The drugs can be administered as a single does, or, alternatively, in multiple doses. A particular advantage of the compounds is their lack of toxicity at doeses substantially greater than those at which satisfactory therapeutic results are obtained. Thus, for example, while some of the compounds are effective in single oral does as low as 50 mg./kg., little or no toxicity is observed when the same compounds are given at doses as high as 1000 mg./kg.

The compounds can be employed in any of a variety of dosage forms, which may include the drug alone or in combination with a pharmaceutical expicient such as a solid or liquid diluent, buffer, binder, coating material, preservative, emulsifier, or the like, the only limitation being the relative instability of the compounds under basic conditions. The solid dosage forms are especially convenient to administer and may, in one embodiment of the invention directed toward the therapy of helminthiasis in domestic animals, comprise the selected compound in admixture with the animals' feed. Such feed compositions can contain in addition to the athelmintic agent other commonly employed feed additives such as growth stimulants, mineral supplements, and the like. Compositions can be prepared as final feeds in which the anthelminic agent is present in the concentration required to give the desired dosage at the normal rate of feeding. Alternatively and preferably the compositions can take the form of premixes in which the drug is present in relatively high concentrations. These premixes can then be blended with the usual feed mixtures in such proportions as to provide the desired level of the drug in the final mix. The latter procedure makes possible a more uniform distribution of the active agent in the final mix and affords economy in shipping.

Other solid dosage forms such as tablets, capsules, and boluses, comprising the anthelmintic agent and one or more compatible pharmaceutically acceptable carriers, can be employed with good results. In addition, of course, the solid dosage forms can contain one or more of the commonly employed tablet lubricants, tablet disintegrants, and the like. Liquid compositions containing the anthelmintic agent are equally effective for controlling the parasites. Such compositions can take the form of solutions, suspensions, drenches, and the like, and can be administered in single or multiple doses. The liquid dosage forms are extremely effective when administered orally but in addition have been found to be effective when given by injection, for example subcutaneously. The latter activity is especially surprising since the parasites generally reside within the gastrointestinal tract, and only rarely are drugs administered by injection effective against such parasites.

Because of their generally superior stability and lower volatility, compositions comprising the 3-aryl, 3-aralkyl, 3-heterocyclic-, and 3-heterocyclic-alkyl compounds are generally preferred in the practice of the invention, although it is to be understood that compositions comprising the 3-alkyl derivatives are also highly effective therapeutic agents. Of the 3-alkyl derivatives, those containing from 2 to 8 carbon atoms are relatively more stable and are preferred among the members of this class.

In order to describe the invention more completely, the following examples are provided by way of illustration, but it is not intended that the scope of the invention be limited thereto.

*Example 1*

Two groups of mice were selected from a larger group of mice which were experimentally infected with *Nematospiroides dubius*. One group of six mice served as a control. A second group of five mice was treated orally in a single dose with 500 mg./kg. of 3-methyl-1,2,4-oxadiazole. The animals were maintained without further treatment for two days and were then sacrificed. At autopsies, the control animals were found to contain an average of 47.3 worms per animal. The treated animals were all completely free of worms.

*Example 2*

The experiment described in Example 1 was repeated in all details except that the treated mice received 500 mg./kg. of 3-methyl-1,2,4-oxadiazole by subcutaneous injection. The treated animals were again completely free of worms.

*Example 3*

The effect of 3-p-chlorophenyl-1,2,4-oxadiazole upon a naturally acquired parasitic infection in sheep was determined in an experiment conducted as described herein. Of two sheep selected for the experiment, one was retained as a control and the other was given a single oral dose of 200 mg./kg. of the drug. All fecal material from both animals was collected for five days, and the feces were examined daily in order to determine the number and species of the parasites expelled. At the end of five days, both animals were sacrificed and examined for remaining worms. The results are indicated in the table.

| Parasite Species | Control Animal | | Treated Animal | |
|---|---|---|---|---|
| | Worms Passed | Worms Remaining | Worms Passed | Worms Remaining |
| Haemonchus contortus | 0 | 359 | 4 | 0 |
| Nematodirus spathiger | 4 | 18 | 94 | 0 |
| Cooperia curtecei | 0 | 73 | (¹) | |
| Trichostrongylus axei | 0 | 35 | (¹) | |
| Trichostrongylus colubriformis | 0 | 71 | (¹) | |

¹ This parasite was not present in the treated animal.

Example 4

Three dogs naturally infected with the hookworm *Ancylostoma caninum* were observed for seven days prior to the administration of a single oral dose of 50 mg./kg. of 3-p-chlorophenyl-1,2,4-oxadiazole. During the observation period, fecal egg counts were carried out by the Stoll method. The drug was administered on the seventh day, and Stoll counts were carried out post-treatment in order to determine efficacy of the drug. The results are shown in the table.

| Day ¹ | Stoll Egg Counts | | |
|---|---|---|---|
| | Dog 1 | Dog 2 | Dog 3 |
| −6 | 9,600 | 200 | 36,800 |
| −5 | 8,400 | 400 | 20,400 |
| −4 | 8,200 | 400 | 23,000 |
| −3 | 11,000 | 1,600 | 10,200 |
| 0 | 37,200 | 1,600 | 8,000 |
| +1 | 9,000 | 1,400 | 9,400 |
| +2 | 200 | 0 | 0 |
| +3 | 0 | 0 | 0 |
| +4 | 0 | 0 | 0 |
| +7 | 0 | 0 | 0 |

¹ Negative indicates before treatment; positive, after.

Example 5

Five dogs naturally infected with the hookworm *Ancylostoma canium* were treated on four consecutive days with 200 mg./kg. of 3-p-chlorophenyl-1,2,4-oxadiazole, administered orally. The decrease in egg counts was followed by the Stoll method as in Example 4. One week after the initiation of therapy, egg counts for all dogs were 0. A total of 137 hookworms had been passed by the five dogs since the beginning of therapy.

Example 6

The experiment described in Example 1 was carried out using a single oral dose of 500 mg./kg. of 3-phenyl-1,2,5-oxadiazole for the treated mice. The results after autopsy indicated a reduction of 85 percent in the worm counts of the treated mice as compared with the control animals.

We claim:
1. The process of treating helminthiasis which comprises administering to a helminth-infested animal host an effective dose of between about 50 and about 1000 mg./kg. of host body weight of a compound of the formula:

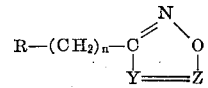

wherein
n is a whole number from 0 to 3;
R is selected from the group consisting of $C_1$–$C_8$ alkyl, phenyl, naphthyl, fluorenyl, phenyl substituted by a member of the group consisting of $C_1$–$C_4$ alkyl, $C_1$–$C_4$ alkoxy, $C_1$–$C_6$ alkylamino, $C_2$–$C_6$ dialkylamino, hydroxy, halo, nitro, cyano, and trifluoromethyl, and heterocyclic rings selected from the group consisting of pyridine, thiophene, furan, thiazole, oxazole, and pyrazole; and
Y and Z are selected from the group consisting of H—C and N, Y being H—C when Z in N, and Y being N when Z is H—C.

2. The process of treating helminthiasis which comprises administering to an animal host an effective dose of between about 50 and about 1000 mg./kg. of host body weight of 3-p-chlorophenyl-1,2,4-oxadiazole.

3. The process of treating helminthiasis which comprises administering to an animal host an effective dose of between about 50 and about 1000 mg./kg. of host body weight of 3-methyl-1,2,4-oxadiazole.

4. The process of treating helminthiasis which comprises administering to an animal host an effective dose of between about 50 and about 1000 mg./kg. of host body weight of 3-n-hexyl-1,2,4-oxadiazole.

5. The process of treating helminthiasis which comprises administering to an animal host an effective dose of between about 50 and about 1000 mg./kg. of host body weight of 3-phenyl-1,2,5-oxadiazole.

No references cited.

JULIAN S. LEVITT, *Primary Examiner.*

SAM ROSEN, *Assistant Examiner.*